(12) United States Patent
Wang

(10) Patent No.: US 10,145,282 B2
(45) Date of Patent: Dec. 4, 2018

(54) METHOD FOR IMPROVING AUTOMOBILE EXHAUST

(71) Applicant: DONGGUAN CITY MAOSHENG ELECTRONICS INDUSTRIES CO., LTD, Dongguan, Guangdong (CN)

(72) Inventor: Derek Wang, Dongguan (CN)

(73) Assignee: DONGGUAN CITY MAO SHENG ELECTRONIC ENTERPRISES CO., LTD, Dongguan (CN)

( * ) Notice: Subject to any disclaimer, the term of this patent is extended or adjusted under 35 U.S.C. 154(b) by 50 days.

(21) Appl. No.: 15/312,721

(22) PCT Filed: May 25, 2015

(86) PCT No.: PCT/CN2015/079732
§ 371 (c)(1),
(2) Date: Nov. 21, 2016

(87) PCT Pub. No.: WO2015/180608
PCT Pub. Date: Dec. 3, 2015

(65) Prior Publication Data
US 2017/0211447 A1    Jul. 27, 2017

(30) Foreign Application Priority Data
May 27, 2014  (CN) .......................... 2014 1 0229484

(51) Int. Cl.
| | |
|---|---|
| *F01N 3/20* | (2006.01) |
| *F01N 3/28* | (2006.01) |
| *C04B 35/581* | (2006.01) |
| *C09D 5/26* | (2006.01) |
| *C04B 35/10* | (2006.01) |
| *C04B 35/52* | (2006.01) |
| *C04B 35/622* | (2006.01) |
| *C09K 5/14* | (2006.01) |

(52) U.S. Cl.
CPC ............ *F01N 3/2046* (2013.01); *C04B 35/10* (2013.01); *C04B 35/52* (2013.01); *C04B 35/581* (2013.01); *C04B 35/62222* (2013.01); *C09D 5/26* (2013.01); *C09K 5/14* (2013.01); *F01N 3/20* (2013.01); *F01N 3/28* (2013.01); *C04B 2235/9607* (2013.01); *F01N 2260/02* (2013.01)

(58) Field of Classification Search
CPC ... F01N 3/2046; F01N 2260/02; C04B 35/10; C04B 35/52; C04B 35/522; C04B 35/581; C04B 35/62222; C09D 5/26
See application file for complete search history.

(56) References Cited

U.S. PATENT DOCUMENTS

| | | | |
|---|---|---|---|
| 6,431,856 B1* | 8/2002 | Maenishi | F23C 6/045 122/4 D |
| 2008/0096451 A1* | 4/2008 | Haerle | B60R 13/0876 442/221 |
| 2011/0072806 A1* | 3/2011 | Nagaoka | F01N 3/02 60/301 |
| 2012/0148853 A1* | 6/2012 | Wakamatsu | F01N 13/102 428/457 |
| 2014/0144539 A1* | 5/2014 | Niwa | F16L 59/08 138/149 |

FOREIGN PATENT DOCUMENTS

JP    WO 2013008810 A1 *  1/2013  ............. F16L 59/08

OTHER PUBLICATIONS

Fraunhofer IST, "Carbon Films," 2010.*

* cited by examiner

*Primary Examiner* — Audrey K Bradley
(74) *Attorney, Agent, or Firm* — Jackson IPG LLC; Demian K. Jackson

(57) ABSTRACT

A method for improving automobile exhaust is disclosed. A catalytic converter is cooled down. The outer surface of the catalytic converter is covered with an infrared thermal radiation material, or black anodizing is carried out on the outer surface. Therefore, the surface thermal radiation of the catalytic converter is improved, and the catalytic converter can be kept being operated under a normal working temperature.

2 Claims, No Drawings

METHOD FOR IMPROVING AUTOMOBILE EXHAUST

TECHNICAL FIELD OF THE INVENTION

The present invention relates to environmental technology; more particularly, to improving automobile exhaust.

DESCRIPTION OF THE RELATED ARTS

For cooling with natural convection, a certain proportion of radiation heat transfer accounts for the calorific value of electronic products. Thus, for improving heat dissipation of the electronic products, radiation heat transfer can be strengthened to play a particular role.

There are two ways to strengthen radiation heat transfer: one is to increase effective heat radiation area, the other is to enhance surface heat dissipation rate. Since structural design inhibits the former approach (the structural design must first meet the product features and the convective heat transfer requirements), the latter one is more preferable.

The primary methods for improving surface heat dissipation rate include anodizing aluminum surface, painting, and spray-painting heat radiation material. These methods are very commonly used in electrical and electronic products.

What is more, air pollution problem in cities is concerned all over China, such as haze in Beijing. In fact, the root of the problem comes from industrial emissions and automobile exhaust. For solving the problem, it is necessary to reduce exhaust emission.

Currently, all automobiles are installed with catalytic converters. The catalytic converters are installed in their emission systems. A precious metal like platinum, palladium, or rhodium is used as a catalyst. The catalytic mechanism is used to reduce harmful exhaust, such as hydrocarbons (HC), carbon monoxide (CO) and nitrogen oxides ($NO_x$). Hence, the catalytic converters help to protect the environment. The minimum operating temperature of the catalytic converter is 300-celsius degrees (° C.), and its normal operating temperature is about 600° C. to 800° C.

On driving an automobile, the faster is the velocity; the higher is the power of the engine with more emission and higher temperature. The temperature often reaches greater than 800° C. or than 900° C. as an ultra-high temperature. Because there is air convection on driving the automobile, the catalytic converter can quickly dissipate a part of heat with the air convection. However, because there are many vehicles and traffic lights in the cities, the automobiles need to wait for the traffic lights quite often. When the cars are waiting for the traffic lights, their engines remain running in an idling state if the drivers do not turn them off. Fuels are burnt in those machines, but the automobiles stop without air convection. The heat of the catalytic converters is not well dissipated. Hence, the temperatures of the converters rise beyond normal. Their performances are significantly declined. Their exhaust conversion rates are also dropped so that more exhaust is emitted to form more pollution.

Moreover, for testing automobile exhaust, the automobiles need to be run in an idling state. Besides, old automobiles would usually have sharply decreased performance for their catalytic converters due to the long-term use. Many of the early automobiles fail in exhaust detection and need to replace parts or stop driving.

Hence, the prior arts do not fulfill all users' requests on actual use.

SUMMARY OF THE INVENTION

The main purpose of the present invention is to provide a catalytic converter having a stable performance, where the content of automobile exhaust is improved.

For achieving the above purpose, the present invention is a method of improving automobile exhaust, characterized in that a catalytic converter is cooled down.

The method is characterized in that a cooling method is to improve a heat dissipation rate of an outer surface of the catalytic converter.

The method is characterized in that the cooling method can be to cover the outer surface of the catalytic converter with an infrared heat radiation material.

The method is characterized in that the infrared heat radiation material can be a nano-carbon material having a hexagonal crystal structure; and that the nano-carbon material comprises at least one material selected from carbon nanoballs, carbon nanotubes, carbon fibers, graphene, graphite and carbon black.

The method is characterized in that the infrared heat radiation material can be a ceramic material; and that the ceramic material comprises at least one material selected from alumina ceramic and aluminum nitride ceramic.

The method is characterized in that the infrared heat radiation material can be black paint.

The method is characterized in that the infrared heat radiation material is covered on the outer surface of the catalytic converter through dry spraying, wet spraying, electrostatic spraying, spin coating or depositing.

The method is characterized in that the depositing is chemical vapor deposition (CVD) or plasma-enhanced chemical vapor deposition (PECVD).

The method is characterized in that the cooling method can be to black-anodize the outer surface of the catalytic converter.

The beneficial effects of the present invention are as follows:

1. The present invention has a first cooling method: An infrared heat radiation material is used to cover the outer surface of the catalytic converter for improving the surface heat radiation rate of the outer surface. Thus, the heat inside the catalytic converter can be efficiently turned into a thermal radiation to be transferred to the air; and, the catalytic converter can reach temperature equilibrium to maintain its operation under a normal working temperature.

2. The present invention has a second cooling method: The surface of the catalytic converter is black-anodized to improve the surface heat dissipation rate of the outer surface of the catalytic converter. If the catalytic converter has a shell of an aluminum alloy, the outer surface is directly anodized. If the catalytic converter has a shell of a non-aluminum alloy, the outer surface is plated with at least one aluminum alloy layer and, then, the at least one aluminum alloy layer is anodized.

3. Through dissipating the heat of the catalytic converter, the catalytic converter can be kept being operated well as a new one. The exhaust of the automobile is well converted to meet the emission standard. Even after ten years of use, the automobile can obtain a good test result of exhaust even without changing the catalytic converter and the air pollution problem in cities can be better solved. If all of the automobiles driven in Beijing use the present invention, the haze problem can be effectively solved.

4. When the surface temperature of a heat source becomes higher, a greater temperature decrease can be obtained by increasing the heat radiation rate. Hence, during the process of starting the automobile until reaching the required operating temperature, the catalytic converter is not affected much.

Accordingly, a novel method of improving automobile exhaust is obtained.

DESCRIPTION OF THE PREFERRED EMBODIMENT

The following description of the preferred embodiment is provided to understand the features and the structures of the present invention.

The present invention is a method of improving automobile exhaust, where a catalytic converter is processed through heat treatment. The method of processing heat treatment to the catalytic converter is to improve a heat dissipation rate of an outer surface of the catalytic converter. The method of processing heat treatment to the catalytic converter is selected from two methods: a first method is to cover an infrared heat radiation material on the outer surface of the catalytic converter, and a second method is to black-anodize the outer surface.

In the first method as a preferable method, the infrared heat radiation material can be a nano-carbon material having a hexagonal crystal structure and the nano-carbon material comprises at least one material selected from carbon nanoballs, carbon nanotubes, carbon fibers, graphene, graphite, and carbon black.

In the first method as a preferable method, the infrared heat radiation material can be a ceramic material, and the ceramic material comprises at least one material selected from alumina ceramic and aluminum nitride ceramic.

In the first method as a preferable method, the infrared heat radiation material can be black paint.

In the first method as a preferable method, the infrared heat radiation material is covered on the outer surface of the catalytic converter through dry spraying, wet spraying, electrostatic spraying, spin coating, or depositing. Therein, the depositing is chemical vapor deposition (CVD), plasma-enhanced chemical vapor deposition (PECVD), or the like.

In method 2, if the catalytic converter has a shell of an aluminum alloy, the shell surfaceshell is directly anodized. If the catalytic converter has a shell of a non-aluminum metal, the shell surface is plated with at least one aluminum alloy layer and, then, the at least one aluminum alloy layer is anodized.

State-of-use 1: In Table 1, the information of Automobile A is shown. In Table 2, an 'examination report of pollutants in exhaust generated by an ignition engine operated in an idling state' for Automobile A before using the present invention is shown. In Table 3, an 'examination report of pollutants in exhaust generated by an ignition engine operated in an idling state' for Automobile A after using the present invention is shown.

State-of-use 2: In Table 4, the information of Automobile B is shown. In Table 5, the 'examination report of pollutants in exhaust generated by an ignition engine operated in an idling state' for Automobile B before using the present invention is shown. In Table 6, an 'examination report of pollutants in exhaust generated by an ignition engine operated in an idling state' for automobile B after using the present invention is shown.

TABLE 1

| Auto. Type | Initial weight | Engine type | Auto. Reg. Date | Catalytic converter |
|---|---|---|---|---|
| SC6371A | 1055 | JL465Q5 | 2004 Apr. 2 | Yes |

TABLE 2

| Auto. A | ASM5025 | | |
|---|---|---|---|
|  | Measure | Standard | Pass |
| CO (%) | 0.63 | 0.95 | Yes |
| HC ($\times 10^{-5}$) | 203 | 150 | No |
| NO ($\times 10^{-5}$) | 4058 | 1650 | No |
| Result | Not qualified | | |

*Examine at 25.0° C., ATM 101.50, RH 76.30

TABLE 3

| Auto. A | ASM5025 | | |
|---|---|---|---|
|  | Measure | Standard | Pass |
| CO (%) | 0.02 | 0.95 | Yes |
| HC ($\times 10^{-5}$) | 29 | 150 | Yes |
| NO ($\times 10^{-5}$) | 28 | 1650 | Yes |
| Result | Qualified | | |

*Examine at 24.5° C., ATM 101.50, RH 76.30

TABLE 4

| Auto. type | Initial weight | Engine type | Auto. Reg. Date | Catalytic converter |
|---|---|---|---|---|
| LZ6500BQ7GLE | 1850 | 4G63 | 2004 Feb. 13 | Yes |

TABLE 5

| Auto. B | ASM5025 | | |
|---|---|---|---|
|  | Measure | Standard | Pass |
| CO (%) | 0.73 | 0.75 | Yes |
| HC ($\times 10^{-5}$) | 126 | 95 | No |
| NO ($\times 10^{-5}$) | 1941 | 950 | No |
| Result | Not qualified | | |

*Examine at 24.6° C., ATM 101.50, RH 76.30

TABLE 6

| Auto. A | ASM5025 | | |
|---|---|---|---|
|  | Measure | Standard | Pass |
| CO (%) | 0.06 | 0.75 | Yes |
| HC ($\times 10^{-5}$) | 13 | 95 | Yes |
| NO ($\times 10^{-5}$) | 25 | 950 | Yes |
| Result | Qualified | | |

*Examine at 24.5° C., ATM 101.50, RH 76.30

In the above state-of-use 1 and state-of-use 2, it is found that the content of pollutants in the exhausts of the two automobiles before using the present invention does not pass the standard. However, after using the present invention, the contents of pollutants in the exhausts are very low, which totally match with the new-car pollutant content and are fully compliant with or even far below the standard.

The preferred embodiment herein disclosed is not intended to limit the scope of the present invention unnecessarily.

Therefore, simple modifications or variations belonging to the equivalent of the scope of the claims and the instructions disclosed herein for a patent are all within the scope of the present invention.

What is claimed is:

1. A method of improving automobile exhaust comprising cooling down a catalytic converter via chemical vapor depositing (CVD) or plasma-enhanced chemical vapor depositing (PECVD) black paint on an outer surface of said catalytic converter so as to improve a heat dissipation rate of said outer surface.

2. A method of improving automobile exhaust comprising cooling down a catalytic converter via plasma-enhanced chemical vapor depositing (PECVD) aluminum nitride ceramic or black paint on an outer surface of said catalytic converter so as to improve a heat dissipation rate of said outer surface.

* * * * *